(12) United States Patent
Bruso et al.

(10) Patent No.: US 6,908,548 B1
(45) Date of Patent: Jun. 21, 2005

(54) PREFABRICATED BIOLOGICAL PURIFICATION SYSTEM

(75) Inventors: Luigi Bruso, Ando. Postal 444-2350, San Francisco de Dos Rios, San José (CR); Pier Enrico Bruso, San José (CR)

(73) Assignee: Luigi Bruso, San Jose (CR)

( * ) Notice: Subject to any disclaimer, the term of this patent is extended or adjusted under 35 U.S.C. 154(b) by 0 days.

(21) Appl. No.: 09/980,154

(22) PCT Filed: Nov. 19, 1999

(86) PCT No.: PCT/CR99/00001

§ 371 (c)(1),
(2), (4) Date: Feb. 25, 2002

(87) PCT Pub. No.: WO00/73217

PCT Pub. Date: Dec. 7, 2000

(30) Foreign Application Priority Data

May 28, 1999 (CR) .................................................. 6036

(51) Int. Cl.⁷ ................................................. C02F 3/04
(52) U.S. Cl. ..................... 210/151; 210/259; 210/532.2
(58) Field of Search ............................ 210/532.2, 252, 210/260, 261, 262, 305, 320, 263, 264, 615–617, 150–151

(56) References Cited

U.S. PATENT DOCUMENTS

| 1,742,911 | A | * | 1/1930 | Gutman et al. ............. 210/252 |
| 2,440,762 | A | * | 5/1948 | Sitton ........................ 210/538 |
| 2,482,353 | A | * | 9/1949 | Loelkes ...................... 210/252 |
| 2,483,564 | A | * | 10/1949 | Sitton ........................ 210/538 |
| 2,553,885 | A | * | 5/1951 | Orman ....................... 210/232 |
| 2,595,923 | A | * | 5/1952 | Carlson ...................... 210/542 |
| 2,749,303 | A | * | 6/1956 | Sitton ....................... 210/532.2 |
| 2,767,801 | A | * | 10/1956 | Eads .......................... 210/170 |
| 2,796,176 | A | * | 6/1957 | Monson ..................... 210/261 |
| 2,857,054 | A | * | 10/1958 | Sitton ....................... 210/532.2 |
| 3,057,796 | A | * | 10/1962 | Davis ......................... 210/207 |
| 3,240,343 | A | * | 3/1966 | Werner ....................... 210/256 |
| 3,451,553 | A | * | 6/1969 | Davis ......................... 210/170 |
| 3,501,007 | A | * | 3/1970 | Davis ......................... 210/170 |
| 3,784,012 | A | * | 1/1974 | Carlson ...................... 210/170 |
| 3,817,864 | A | * | 6/1974 | Carlson et al. ............. 210/170 |
| 4,031,009 | A | * | 6/1977 | Hicks ......................... 210/164 |
| 4,100,073 | A | * | 7/1978 | Hopcroft ................... 210/532.1 |
| 4,971,690 | A | * | 11/1990 | Justice ....................... 210/170 |
| 4,982,533 | A | * | 1/1991 | Florence .................... 52/169.5 |
| 5,086,594 | A | * | 2/1992 | Florence .................... 52/169.5 |
| 5,131,196 | A | * | 7/1992 | Florence .................... 52/169.5 |
| 5,409,603 | A | * | 4/1995 | Tsung ......................... 210/169 |
| 5,989,416 | A | * | 11/1999 | Gorton ....................... 210/151 |
| 5,997,735 | A | * | 12/1999 | Gorton ....................... 210/151 |
| 6,270,661 | B1 | * | 8/2001 | Jowett ........................ 210/151 |

FOREIGN PATENT DOCUMENTS

| EP | 0555743 A1 | * | 8/1993 | ............ C02F/3/22 |
| EP | 0569828 A1 | * | 11/1993 | ............ C02F/3/28 |
| EP | 0878444 A1 | * | 11/1998 | ............ C02F/3/02 |
| GB | 2276617 A | * | 5/1994 | ............ C02F/3/00 |

* cited by examiner

*Primary Examiner*—Robert James Popovics
(74) *Attorney, Agent, or Firm*—Pauley Petersen & Erickson

(57) ABSTRACT

A prefabricated biological purification system for treatment of residential wastewater having a primary purification unit and a secondary purification unit containing a filling material having a grain size distribution of about 2 cm to about 4 cm in diameter. The primary purification unit having modular element forming a container, and internal elements including an inflow tube, an internal separation panel with a fluid passage duct defining a first internal sector and a second internal sector, a trapezoidal diaphragm, and a device for controlling liquid outflow. A second diaphragm in a form of an octagonal modular element is positioned within the container and a horizontal fluid passage duct is formed as a horizontal opening between portion of the internal separation panel and the second diaphragm. A flow control element forms an intake space between a bottom end portion of an outlet pipe and the trapezoidal diaphragm.

9 Claims, 3 Drawing Sheets

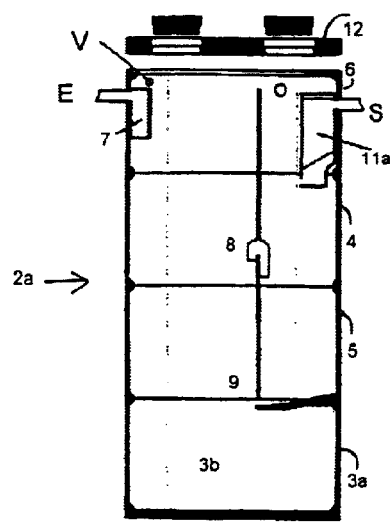
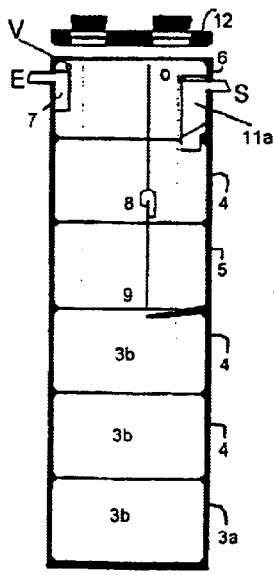
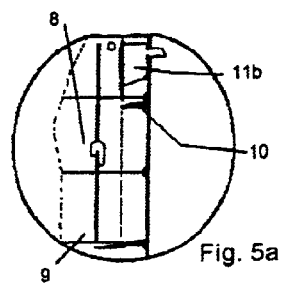
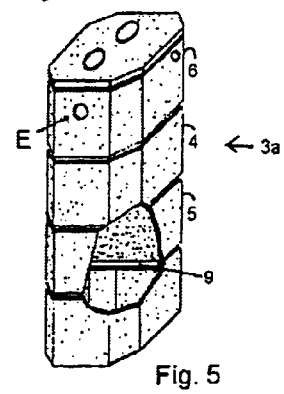

PREFABRICATED BIOLOGICAL PURIFICATION SYSTEM

BACKGROUND OF THE INVENTION

The prefabricated biological purification system is used to purify domestic sewage enclosed in the technological sector of civil construction, in the field of sewage purifying treatments.

One problem to be solved with this prefabricated biological purification system is to purify domestic sewage in a satisfactory manner, using an easy and rapid installation system with simple but efficient functioning that requires no machinery or periodic maintenance for its internal functioning.

The system also provides a practical and economic solution for constructors when dealing with the projection and construction of urbanizations, because the costs of the treatment plants currently used are very high, and the periodic and extraordinary maintenance costs fall on the entire community, not to mention their environmental impact, because they are placed on the surface where anyone can see them.

One main characteristic of this system is the modulization capacity of all its components, because a minimum of 25 people may be attended, without having a maximum limit.

It is important to note that the minimum size for the optimal functioning of the prefabricated biological purification system is 25 users, as previously indicated. A modular increase may be done in groups of 25 people, a reason why the primary unit is respected, while the modular increase for the secondary unit may be done in groups of 50 people.

Also, with the prefabricated biological purification system, responsibility for the proper use of the sanitary facilities by the users from each residential unit is individualized, for improper use of such facilities creates problems only to those who generate them. Repair and extraordinary maintenance expenses, in this case, fall on the thoughtless user and not the entire community.

SUMMARY OF THE INVENTION

The prefabricated biological purification apparatus of this invention is a complete unit to purify domestic sewage, enclosed within the technologic sector of the civil construction, specifically, in the field of sewage treatment apparatuses. It is a very versatile apparatus because it may be used in different kinds of constructions, ranging from a single residence to condominiums, buildings, complete urbanizations, etc. with unitary or multiple units, depending on the needs. The Prefabricated Biological Purification apparatus of this invention has two basic units with two containers of variable dimensions, depending on the type, complete with all their modular elements, bottom, walls and cover, in addition to all the completely internal elements.

All components have a shape that allows easy handling, transportation and assembly, with no installation need for special machinery or qualified labor.

Operation of the apparatus may be explained as follows: one important purifying phase occurs in the first unit, which is a Prefabricated Biological Depurator according to Patent Costa Rica No. 2540 and European Patent Reference EP-A-0 878 444 with internal and external changes so as to optimize operation, in three consecutive fermentation phases: aerobic, anaerobic and declaration, with the possibility of internal re-circulation of mud. The effluent of the purifier enters the second unit where it is evenly distributed through a fluid distributor. In the second unit, the purification of the polluting matters by oxidation is accomplished with a bacterial film that covers the filling material, where a consecutive anaerobic and partially anaerobic fermentation occurs. The effluent of the apparatus may be poured into a receptive body with no need for further treatments.

The prefabricated biological purification apparatus needs no kind of treatments or periodic cleaning because it produces no mud, and because it needs no machinery for its internal operating, it has no usage costs, and because the entire unit is buried, it does not have environmental impacts.

BRIEF DESCRIPTION OF THE DRAWINGS

This invention is described with reference to the included drawings, wherein:

FIG. 3 is a vertical sectional view of a first purifying unit, according to Patent Costa Rica No. 2540, of a basic type;

FIG. 4 is a vertical sectional view of a first purifying unit, according to Patent Costa Rica No. 2540, of an increased type;

FIG. 5 is a partial cut-away perspective view of an octagonal modular bottom element, 81×101×55 cm;

FIG. 5a is a vertical sectional view of an octagonal modular bottom element with elements modified from FIG. 5.

Figures 1, 2:
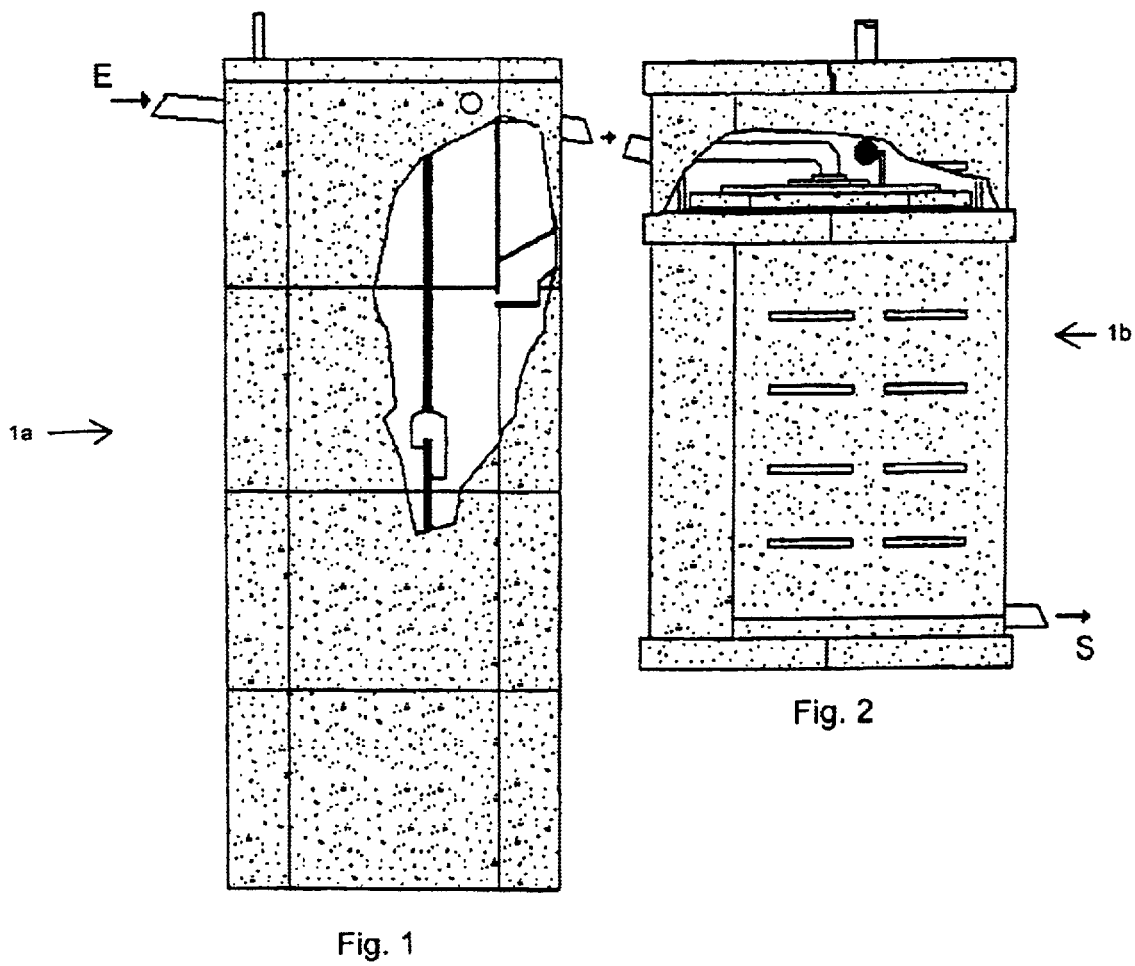
FIG. 1 is a partial cut-away view of a first purifying unit of a complete system.
FIG. 2 is a partial cut-away view of a second purifying unit of a complete system.
Figure 6:
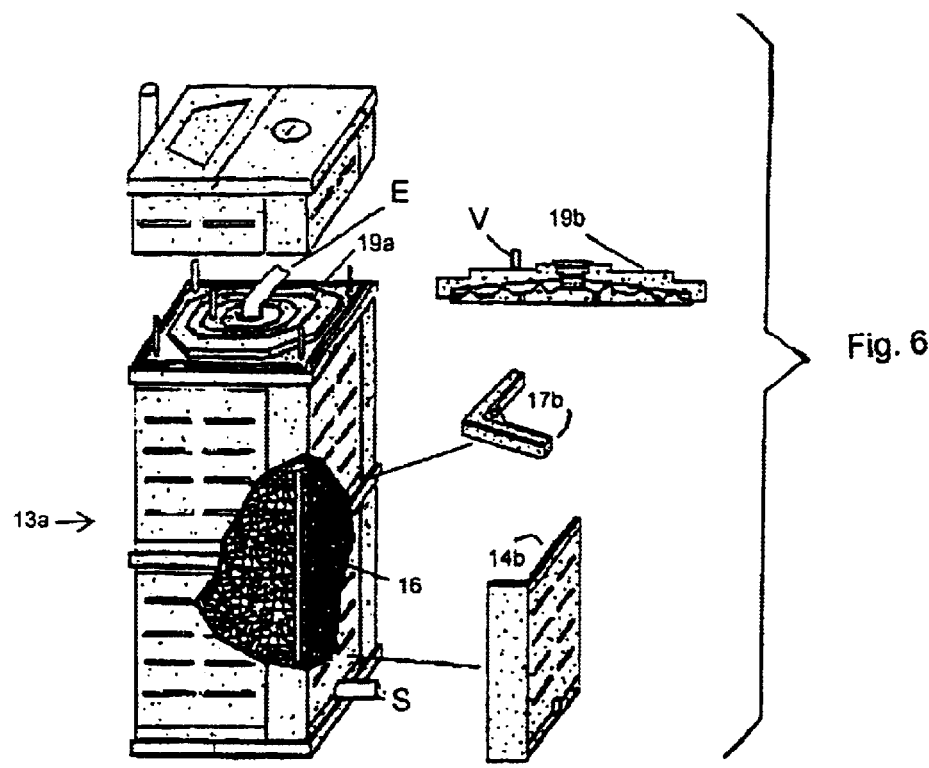
FIG. 6 is a view of a second purifying unit, a basic type.
Figure 7:
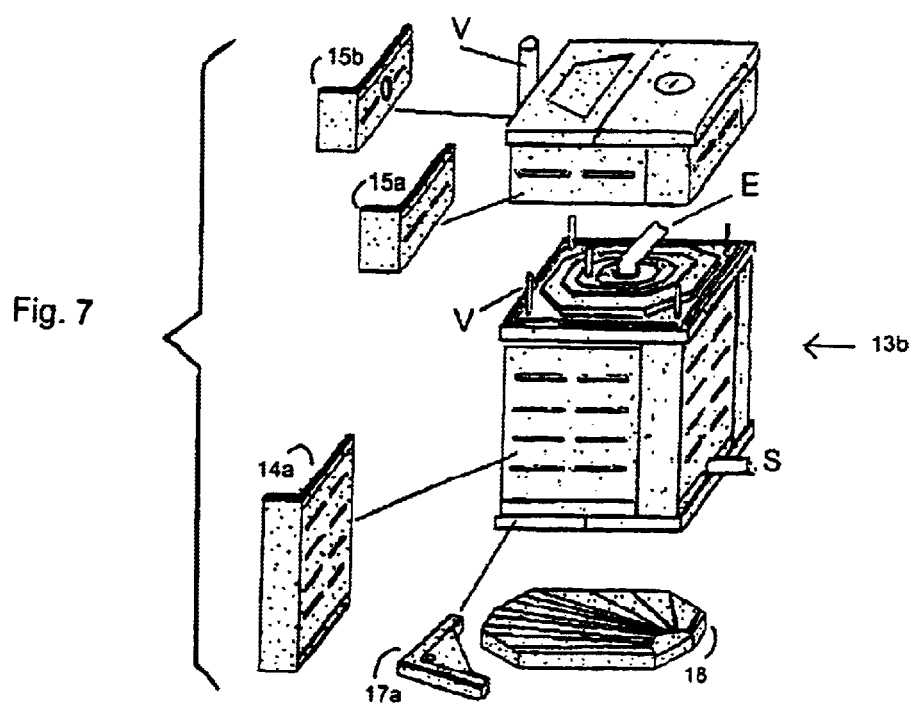
FIG. 7 is a view of a second purifying unit, a reduced type.

In the drawings, E=in, S=out, and V=ventilation.

DESCRIPTION OF PREFERRED EMBODIMENTS

The following listing of the elements within the FIGURES further describes the embodiments therein.

Element 1a includes a first purifying unit of a complete system;

Element 1b includes a second purifying unit of a complete systems;

Element 2a includes a first purifying unit, according to Patent Costa Rica No. 2540, of a basic type;

Element 2b includes a first purifying unit, according to Patent Costa Rica No. 2540, of an increased type;

Element 3a includes an octagonal modular bottom element, 81×101×55 cm;

Element 3b is a schematic view of an internal mud digestion zone;

Element 4 is a perspective view of a ring, an octagonal modular element 81×101×51 cm;

Element 5 is a perspective view of a semi-concave octagonal modular element with a lower diaphragm (change) 81×101×5 cm;

Element 6 is perspective view of an octagonal modular element (81×101×5 cm) with supplemental inlets for soapy waters (change);

Element 7 is a view of an inlet pipe;

Element 8 is a view of a reduced separation sheet, with a fluid passage duct (change);

Element 9 is a view of characteristics of a horizontal fluid passage duct;

Element 10 is a view of an upper trapezoid diaphragm;

Element 11a is a view of a control flug element (change);

Element 11b is a view of a control flug in concrete (change);

Element 12 is a view of an octagonal cover with a small inspection lids;

Element 13a includes a second purifying unit, a basic type;

Element 13b includes a second purifying unit, a reduced type;

Element 14a is a view of a normal modular panel, 98 centimeters high;

Element 14b is a view of an outlet orifice of modular panels, 98 centimeters high;

Element 15a is a view of a normal modular panel, 30 centimeters high;

Element 15b is a view of modular panels, 30 centimeters high, having an outlet of 10 centimeters in diameter;

Element 16 shows characteristics of internal filling material;

Element 17a shows a view of a grooved triangular piece;

Element 17b shows a view of an intermediate triangular piece;

Element 18 shows a bottom octagonal piece;

Element 19a shows a flow distributor; and

Element 19b shows a vertical section.

The prefabricated biological purification system comprises two basic purifying units: a primary purifying unit, such as the Prefabricated Biological Depurator disclosed in Patent Costa Rica No. 2540 and European Patent Reference EP-A-0 878 444, changed external and internally, having prefabricated modular elements made of concrete with an octagonal elongated shape of 81×101 cm. In plant and 51 cm high (elements 3a, 4, 5, 6) assembled one on top of the other in order to obtain an octagonal container that varies in height according to the number of assembled modules (3 to 6 modules maximum). The internal elements necessary for functioning are installed inside: the inlet pipe (element 7), the separation sheets with the fluid passage duct (element 8), the trapezoidal diaphragm (element 10), and the flow control element modified in the entrance space (elements 11a, 11b). The container is completed with its respective octagonal-shaped cover (element 12).

The amendments to the Patent Costa Rica No. 2540 include a reduction in the height of the internal separation sheet and the placement of a semi-concave octagonal element in the third position from the upper part (element 5). Between the diaphragm of the semi-concave element and the bottom of the internal separation wall (element 9), there is a 5 cm communicating space between the first two sectors that allows eventual mud that passes to the second sector through the fluid passage duct (element 8), to return to the first sector in the mud digestion zone (element 3b). Also, an inlet is designed for the entrance of soapy waters on both sides of the upper octagonal element, in correspondence with the second internal sector (element 6).

The secondary purifying unit is a container, in this case, with a cubic shape having modular L-shaped, prefabricated, 98 cm high panels made of concrete (elements 14a, 14b), assembled with each other and placed on four triangular pieces with proper slots to fit the panels (element 17a). In the center of these triangular pieces, an octagonal bottom piece is installed (element 18). The panels in the upper part are assembled with a square structure composed of four triangular pieces, and on this structure, a liquid distributor is installed (elements 19a, 19b). If it is necessary to add more panels, four intermediate triangular pieces are installed between two modules (element 17b). Once all these elements are assembled, as previously explained, they compose a cubic container that varies in size according to the number of added modules. The interior of the container is filled with pebbles with a grain size distribution ranging between 2 and 4 cm diameter.

In the upper part of the secondary unit, four modular L-shaped elements, of 30 cm high are installed on the closing elements (elements 15a, 15b) and it is fully completed with a square cover with a small lid for inspections. This last part of the container has the outlet for the general ventilation tube of 10 cm diameter and the inlet pipe to the fluid distributor 10 cm diameter.

The prefabricated biological purification system of domestic sewage, as previously explained, includes a set of two purifying units and its functioning is further explained in the following specification. The sewage coming from the house enters the primary unit, where a main fermentation and decomposition phase takes place, including three consecutive phases of decantation and aerobic and anaerobic fermentation, with the possibility of internal re-circulation of the semi-digested mud that passes from a sector to the other, thus allowing the almost complete decomposition of the solid particles that are not detected in the effluent and that do not remain in the interior of the purifying unit, because they appear in the effluent in the form of microscopic already mineralized particles.

The excellent functioning efficiency occurs due to the high bacterial concentration existing in the interior of the first sector of the primary purifying unit, which allows the almost complete decomposition of the SSS (Sedimentable Suspended Solids) in approximately 99.9%, with an average effluent of greater than 0.1 m/LH and also a high reduction degree of the $DBO_5$ (Oxygen Biochemical Demand in 5 days) in approximately 96.5%, with an average effluent of 56 mg/L. Besides, the water acidity conditions remain neutral with a constant Ph between 6.5 and 7.5. In the secondary purifying unit, the $DBO_5$ values and the remaining Total Solids in Suspension are subsequently reduced, since the liquid passing through a filling material becomes oxygenized and the bacterial film covering such material allows, by retaining the bacteria, a subsequent phase of aerobic and partially anaerobic fermentation of the remaining polluting load. In this second purifying phase, no solids are detected and there is no mud formation.

The effluent of the prefabricated biological purification system, because of its high purifying degree, may be poured into any receiver container with no further treatment.

The filling material of the second unit may be of various kinds, such as stone, coke, plastic segments, and the like provided that their diameter ranges between 2 and 4 cm.

The entire system and the machinery need no periodic maintenance for internal operation. Besides, the entire unit is buried and thus has no environmental impact. For the fermentation processes, no chemical substance or lyophilized bacterial groups are needed.

What is claimed is:

1. In a prefabricated biological purification system for treatment of residential wastewater, the system having two main units including a primary purification unit including a prefabricated biological depurator and a secondary purification unit containing a filling material having a grain size distribution of about 2 cm to about 4 cm in diameter, the primary purification unit having modular elements of an elongated octagonal shape and assembled one on top of the other, wherein the modular elements form a container which varies in height depending on a number of the modular elements assembled, internal elements having an inflow tube, an internal separation panel with fluid passage duct, a trapezoidal diaphragm, and a device for controlling liquid outflow and the container with an octagonal cover, the primary purification unit comprising:

(a) the internal separation panel defining a first internal sector and a second internal sector;

(b) a second diaphragm in a form of an octagonal modular element positioned within the container;

(c) a horizontal fluid passage duct formed as a horizontal opening of 5 cm between a bottom end portion of the internal separation panel and the second diaphragm; and (d) a flow control element forming an intake space between a bottom end portion of an outlet pipe and the trapezoidal diaphragm.

2. In the prefabricated biological purification system according to claim 1, wherein the secondary purification unit of the two main units comprises: panels of various shapes assembled to form an external structure; four triangular pieces and one central octagonal piece forming a bottom element; four L-shaped pieces with holes in corner areas for a vent tube to pass through which together form a intermediate structure holding the panels together; and a one-piece compact fluid distributor.

3. In the prefabricated biological purification system according to claim 2, wherein the one-piece compact fluid distributor, prefabricated from concrete, requires no machinery for operation, and has an intake port in an upper central portion, a vent port in an upper section, and fluid distribution holes in a lower section.

4. In the prefabricated biological purification system according to claim 1, wherein the horizontal fluid passage duct is positionable at different levels inside the container, depending on a capacity of the container and of the horizontal opening formed between the internal separation panel and the second diaphragm that permits internal passage of fluid between the first internal sector and the second internal sector.

5. In the prefabricated biological purification system according to claim 1, wherein the second purification unit further comprises a one-piece fluid distributor in fluid communication with the outlet pipe.

6. In the prefabricated biological purification system according to claim 1, wherein each of the modular elements has the elongated octagonal shape of 81 cm×101 cm at a base and 51 cm in height.

7. In the prefabricated biological purification system according to claim 1, further comprising a soapy water inlet formed on both sides of an upper modular element and in fluid communication with the second internal sector.

8. In the prefabricated biological purification system according to claim 1, wherein the system has a secondary purifying unit comprising several prefabricated concrete panels and respective upper and lower connecting elements and a fluid distributor, and system components are modular.

9. In the prefabricated biological purification system according to claim 1, wherein a one-piece compact fluid distributor, prefabricated from concrete, requires no machinery for operation, and has an intake port in an upper central portion, a vent port in an upper section, and fluid distribution holes in a lower section.

* * * * *